US011026224B2

(12) United States Patent
Vilaipornsawai et al.

(10) Patent No.: US 11,026,224 B2
(45) Date of Patent: *Jun. 1, 2021

(54) METHOD AND SYSTEM FOR ENHANCING DATA CHANNEL RELIABILITY USING MULTIPLE TRANSMIT RECEIVE POINTS

(71) Applicant: Huawei Technologies Co., Ltd., Shenzhen (CN)

(72) Inventors: Usa Vilaipornsawai, Nepean (CA); Mohammadhadi Baligh, Ottawa (CA); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,434

(22) Filed: Jun. 2, 2020

(65) Prior Publication Data
US 2020/0296704 A1    Sep. 17, 2020

Related U.S. Application Data

(63) Continuation of application No. 16/028,204, filed on Jul. 5, 2018, now Pat. No. 10,701,679.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC ............................ H04W 72/042; H04L 5/0048
See application file for complete search history.

(56) References Cited

U.S. PATENT DOCUMENTS

2015/0365154 A1* 12/2015 Davydov ............. H04B 7/0626
                                                             370/329
2018/0337757 A1* 11/2018 Noh ...................... H04L 5/0048
2019/0037586 A1    1/2019 Park et al.

FOREIGN PATENT DOCUMENTS

CN              108199819 A      6/2018

OTHER PUBLICATIONS

3rd Generation Partnership Project; Technical Specification Group Radio Access Network; NR; Multiplexing abd channel coding (Release 15), 3GPP TS 38.212, Jun. 2018, 94 Pages, V15.2.0.

(Continued)

*Primary Examiner* — Afshawn M Towfighi
(74) *Attorney, Agent, or Firm* — Slater Matsil, LLP

(57) ABSTRACT

Devices and methods are provided for receiving a first indication and a second indication, the first indication associated with a first set of transmission parameter information for a first repetition of data received in a Physical Downlink Shared Channel (PDSCH) and the second indication associated with a second set of transmission parameter information for a second repetition of data received in the PDSCH. Each set of transmission parameter information corresponds to a Quasi-Co-Location (QCL) information for the respective repetition of data. In addition, the method involves receiving a first PDSCH repetition and a second PDSCH repetition. A channel estimate can then be performed for the first PDSCH repetition based on the QCL information for the first PDSCH repetition and a channel estimate for the second PDSCH repetition based on the QCL information for the second PDSCH repetition.

26 Claims, 11 Drawing Sheets

(56) References Cited

OTHER PUBLICATIONS

3rd Generation Partnership Project; Technical Specification Group Radio Access Network; NR; Physical layer procedures for control (Release 15), 3GPP TS 38.213, Jun. 2018, 98 Pages, V15.2.0.
3GPP TS 38.214 V15.1.0 (Mar. 2018), 3rd Generation Partnership Project; Technical Specification Group Radio Access Network; NR; Physical layer procedures for data (Release 15).
ZTE, "Remaining issues on QCL", 3GPP TSG RAN WG1 Meeting #93, R1-1805836, May 21-25, 2018, 7 Pages, Busan, Korea.
QUALCOMM Incorporated, "Remaining Details on QCL", 3GPP TSG-RAN WG1 Meeting #93, R1-1807351, May 21-25, 2018, 10 Pages, Busan, Korea.
3rd Generation Partnership Project; Technical Specification Group Radio Access Network; NR; Radio Resource Control (RRC) protocol specification (Release 15), 3GPP TS 38.331, V15.9.0, 532 Pages, Mar. 2020.

\* cited by examiner

| TCI Configuration | TCI Pattern |
|---|---|
| 0 | TCIStateID1, TCIStateID2 |
| 1 | TCIStateID2, TCIStateID3 |
| 2 | TCIStateID1, TCIStateID3, TCIStateID2 |
| 3 | TCIStateID1, TCIStateID1, TCIStateID2, TCIStateID2 |

FIG. 6A

| AP Configuration | AP Pattern |
|---|---|
| 0 | AP value1, AP value2 |
| 1 | AP value2, AP value3 |
| 2 | AP value1, AP value3, AP value2 |
| 3 | AP value1, AP value1, AP value2, AP value2 |

FIG. 6B

| TCI Configuration | TCI Pattern | AP Pattern |
|---|---|---|
| 0 | TCIStateID1, TCIStateID2 | AP value1, AP value2 |
| 1 | TCIStateID2, TCIStateID3 | AP value2, AP value3 |
| 2 | TCIStateID1, TCIStateID3, TCIStateID2 | AP value1, AP value3, AP value2 |
| 3 | TCIStateID1, TCIStateID2, TCIStateID2 | AP value1, AP value1, AP value2, AP value2 |

| RV Configuration | RV Pattern |
|---|---|
| 0 | RV value1, RV value2 |
| 1 | RV value2, RV value3 |
| 2 | RV value1, RV value3, RV value2 |
| 3 | RV value1, RV value1, RV value2, RV value2 |

| MCS Configuration | MCS Pattern |
|---|---|
| 0 | MCS value1, MCS value2 |
| 1 | MCS value2, MCS value3 |
| 2 | MCS value1, MCS value3, MCS value2 |
| 3 | MCS value1, MCS value1, MCS value2, MCS value2 |

| DMRS Configuration | DMRS Pattern |
|---|---|
| 0 | DMRS value1, DMRS value2 |
| 1 | DMRS value2, DMRS value3 |
| 2 | DMRS value1, DMRS value3, DMRS value2 |
| 3 | DMRS value1, DMRS value1, MDMRS value2, DMRS value2 |

//  METHOD AND SYSTEM FOR ENHANCING DATA CHANNEL RELIABILITY USING MULTIPLE TRANSMIT RECEIVE POINTS

CROSS-REFERENCE TO RELATED APPLICATIONS

This application is a continuation of U.S. patent application Ser. No. 16/028,204 filed on Jul. 5, 2018 and entitled "Method and System for Enhancing Data Channel Reliability Using Multiple Transmit Receive Points", which is hereby incorporated by reference herein as if reproduced in its entirety.

TECHNICAL FIELD

The present invention relates generally to a system and method for wireless communications, and, in particular embodiments, to a system and method for enhancing data channel reliability using multiple transmit receive points (TRPs).

BACKGROUND

An air interface is the wireless communications link between two or more communicating devices, such as a radio access network device (e.g., a base station, a NodeB, an evolved NodeB, a transmit point) and an electronic device (ED) (e.g., a user equipment (UE), a mobile phone, a sensor, a camera). Typically, both communicating devices need to know specific parameters of the air interface in order to successfully transmit and receive a transmission.

In 3GPP NR Release 15 (R15), a physical downlink shared channel (PDSCH) repetition for PDSCH with only one layer is supported. PDSCH repetition is intended to improve PDSCH reliability. However, the manner in which the mechanism is agreed to operate only allows the repetitions to be transmitted from the same transmit receive point (TRP) or beam. This is at least in part because there is only one quasi-co-location (QCL) information between the demodulation reference signal (DMRS) port or port group of the PDSCH, which is used for channel estimation, and a reference signal (RS) that is associated with an RS antenna port. QCL indicates a relationship between two RSs, and a specified set of channel parameters, for use in relation to ED channel estimation based on one of the two RSs. Related parameters such as Doppler shift, Doppler spread, average delay, and delay spread, can be derived from RS. However, in coordinated multipoint (CoMP) scenarios, multiple channel state information (CSI) processes can be configured for the ED to receive multiple CSI-RS from multiple transmission points (TPs), and the demodulation and timing reference for PDSCH may change dynamically. In such scenarios, QCL signalling may be used, to let the ED know which CSI-RS to use to derive the timing reference. Therefore, when a QCL information is configured for the DMRS port or port group and the RS port, the DMRS port can use the Doppler shift that has already been obtained by the RS port.

QCL information is defined in a transmission control indication (TCI) state that is configured by transmission of a higher layer parameter. The QCL assumption between the DMRS port or port group of the PDSCH and the RS port can be used by the ED when the ED is performing channel estimation for a link between a TRP and an ED. Channel estimation is performed by using received DMRSs and determining how the DMRS changes due to channel effects.

The ED can utilize the QCL information defined between the DMRS of the PDSCH, which is associated with a DMRS port, and the RS, which is associated with a RS antenna port, when performing channel estimation, and use channel parameters (e.g. any of Doppler shift, Doppler spread, average delay, delay spread, Spatial Rx parameter) in the defined QCL information that have already obtained from the RS. Then the channel estimate is used in demodulating PDSCH received in the port(s) that is the same as DMRS port(s) of PDSCH.

In R15, the number of PDSCH repetitions is configured by a higher layer parameter, namely pdsch-AggregationFactor, having possible values of 2, 4 or 8. TS38.214 states "when the UE is configured with aggregationFactorDL>1, the same symbol allocation is applied across the aggregationFactorDL consecutive slots. The UE may expect that the TB is repeated within each symbol allocation among each of the aggregationFactorDL consecutive slots and the PDSCH is limited to a single transmission layer."

The R15 mechanism for supporting multiple PDSCH repetitions mentioned above has drawbacks. As agreed upon in R15, DCI is transmitted once for all PDSCH repetitions. Only one TCI state is defined in the DCI. The one TCI state has only one QCL information. Because a QCL information defines channel parameters associated with a channel for a particular transmission point or beam, if there is only one QCL information, all repetitions are considered to be transmitted from one TRP or one beam.

Accordingly, there is a desire for an improved method of supporting multiple PDSCH repetitions received from multiple TRPs or multiple beams.

SUMMARY

Technical advantages are generally achieved by embodiments of this disclosure which describe a system and method for providing higher PDSCH reliability by exploiting link diversity by transmitting different PDSCH repetitions from multiple TRPs.

According to an aspect of the present disclosure, there is provided a method for a user equipment (UE) involving: receiving a first indication and a second indication, the first indication associated with a first set of transmission parameter information for a first repetition of data received in a Physical Downlink Shared Channel (PDSCH) and the second indication associated with a second set of transmission parameter information for a second repetition of data received in the PDSCH, wherein each set of transmission parameter information corresponds to a Quasi-Co-Location (QCL) information for the respective repetition of data; receiving a first PDSCH repetition and a second PDSCH repetition; and performing a channel estimate for the first PDSCH repetition based on the QCL information for the first PDSCH repetition and a channel estimate for the second PDSCH repetition based on the QCL information for the second PDSCH repetition.

In some embodiments, receiving the first indication and the second indication involves receiving the first and second indications by one of: dynamic signaling using downlink control information (DCI); a combination of semi-static signaling using higher layer signaling and dynamic signaling; a combination of using a predefined set of configurations and dynamic signaling to select a particular configuration of the set of configurations; and a predefined set of indications either known to the UE or signaled using higher layer signaling.

In some embodiments, receiving the first indication and the second indication involves receiving the first and second indications in a DCI; wherein the DCI has one of the following formats: format (1_0); format (1_1); and a format similar to format (1_1), but with a smaller payload.

In some embodiments, receiving the first and second indication by dynamic signaling using DCI involves receiving a plurality of transmission configuration indications (TCIs), each TCI identifying a TCI state that indicates the QCL information for a respective PDSCH repetition.

In some embodiments, the number of TCIs is equal to a total number of PDSCH repetitions, and each TCI is associated with a respective PDSCH repetition.

In some embodiments, the number of TCIs is less than a total number of PDSCH repetitions, and a pattern of TCIs associated with the PDSCH repetitions is repeated partially, or more than once, to correspond to the total number of PDSCH repetitions.

In some embodiments, the number of TCIs is greater than a total number of PDSCH repetitions, and the TCIs are used in an order received for each PDSCH repetition until all of the PDSCH repetitions are received.

In some embodiments, receiving the first and second indications by dynamic signaling using DCI involves: receiving a plurality of antenna port (AP) or AP group configuration indications, each AP or AP group configuration indication being associated with a transmission configuration indication (TCI) state that indicates a QCL information for a respective PDSCH repetition.

In some embodiments, the number of AP or AP group configuration indications is equal to a number of TCI states, and each AP or AP group configuration indication being associated with a respective TCI.

In some embodiments, the number of AP or AP group configuration indications is less than a number of TCI states; if there is only one AP or AP group configuration indication, the same AP or AP group configuration indication is used for each TCI state; and if there is more than one AP or AP group configuration indication, an association between the more than one AP or AP group configuration indication and the TCI states is received.

In some embodiments, the number of AP or AP group configuration indications is greater than a total number of PDSCH repetitions, and the TCI states are configured in an order received for each respective PDSCH repetition until all of the PDSCH repetitions are received.

In some embodiments, receiving the first indication and the second indication involves receiving a plurality of TCI state pattern configurations, a plurality of AP or AP group pattern configurations, or a plurality of combinations of TCI state pattern configurations and AP or AP group pattern configurations by higher layer signaling.

In some embodiments, the method further involves: receiving a media access control (MAC) control element (CE) to activate at least one TCI state pattern configuration, at least one AP or AP group pattern configuration, or at least one combination of a TCI state pattern configuration and an AP or AP group pattern configuration.

In some embodiments, the method further involves: receiving an indication that a TCI state is included in a DCI to be received by the UE; and receiving in the DCI at least one of: at least one indication of a TCI state for a respective PDSCH repetition; at least one indication of a TCI state pattern that indicates a particular TCI pattern configuration, an AP or AP group pattern that indicates a particular a AP or AP group pattern configuration, or at least one combination of a TCI state pattern configuration and an AP or AP group pattern configuration that indicates a particular TCI pattern configuration and AP or AP group pattern configuration.

In some embodiments, the at least one indication is an index of a table or list, and the index is associated with the particular TCI pattern configuration, the particular AP or AP group pattern configuration, or the particular combination of TCI state pattern configuration and AP or AP group pattern configuration.

In some embodiments, receiving the first indication and the second indication involves: receiving an identification of a TCI state pattern for identifying a particular TCI state pattern from a plurality of predefined TCI state patterns on the UE, each TCI state pattern identifying a set of TCI states, each TCI state corresponding to a QCL information for one of the PDSCH repetitions.

In some embodiments, receiving the indication for each of two or more QCL informations involves: receiving a plurality of AP or AP group pattern configurations by higher layer signaling; receiving in the DCI at least one of: at least one indication of an AP configuration corresponding to an AP or AP group pattern, each AP or AP group pattern associated with TCI states for PDSCH repetitions.

In some embodiments, the method further involves receiving a media access control (MAC) control element (CE) to activate at least one AP or AP group pattern configuration of the plurality of AP or AP group pattern configurations.

In some embodiments, the method further involves receiving an indication that a TCI is included in a received DCI.

In some embodiments, receiving the indication for each of two or more QCL informations involves: receiving an antenna port (AP) pattern indication identifying a particular AP or AP group pattern from a plurality of predefined AP or AP group patterns, each AP or AP group pattern associated with a TCI state pattern for the PDSCH repetitions.

In some embodiments, multiple reference signal (RS) ports associated with a TCI state are associated with at least one DMRS port or DMRS port group.

In some embodiments, the RS ports are at least one of: phase tracking reference signal (PT-RS) ports; channel state information reference signal (CSI-RS) ports; and synchronization signal block (SSB) ports.

In some embodiments, the method further involves receiving an indication of a first instance of a transmission parameter and a second instance of a transmission parameter, the first and second instances of the transmission parameters associated with a respective PDSCH repetition.

In some embodiments, the transmission parameter is at least one of: redundancy version (RV); modulation order; and DMRS sequence initialization.

In some embodiments, the method further involves: for a second signal transmitted at the transmitter end of the communication system on a second transmission layer, receiving an indication for each of two or more QCL informations, each QCL information associated with either a respective first PDSCH transmission or at least one PDSCH repetition of the second signal; and receiving the first PDSCH transmission of the second signal or the at least one PDSCH repetition of the second signal based at least in part on the QCL information associated with the first PDSCH transmission of the second signal or the at least one PDSCH repetition of the second signal.

According to an aspect of the present disclosure, there is provided a user equipment (UE) including at least one antenna; a processor; and a processor readable medium. The processor readable medium has stored thereon processor executable instructions that when executed cause the processor to: receive a first indication and a second indication, the first indication associated with a first set of transmission parameter information for a first repetition of data received in a Physical Downlink Shared Channel (PDSCH) and the second indication associated with a second set of transmission parameter information for a second repetition of data received in the PDSCH, wherein each set of transmission parameter information corresponds to a Quasi-Co-Location (QCL) information for the respective repetition of data; receive a first PDSCH repetition and a second PDSCH repetition; and perform a channel estimate for the first PDSCH repetition based on the QCL information for the first PDSCH repetition and a channel estimate for the second PDSCH repetition based on the QCL information for the second PDSCH repetition.

BRIEF DESCRIPTION OF THE DRAWINGS

For a more complete understanding of the present invention, and the advantages thereof, reference is now made to the following description taken in conjunction with the accompanying drawings, in which:

FIG. 6A is an example table illustrating TCI state patterns with associated configuration indices according to an aspect of the disclosure.

FIG. 6B is an example table illustrating AP patterns with associated configuration indices according to an aspect of the disclosure.

FIG. to is a block diagram illustrating an example of redundancy version (RV) information in a RV field included in DCI according to an aspect of the disclosure.

Figures 10, 11:
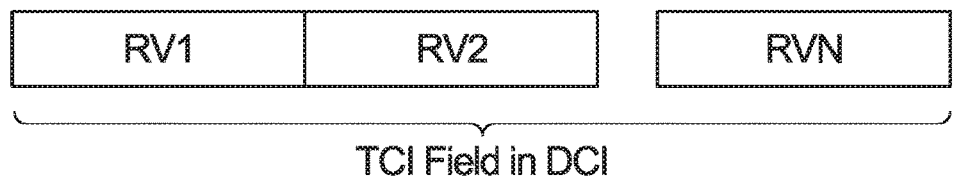

FIG. 11 is a table illustrating RV patterns and associated configuration indices according to an aspect of the disclosure.

Figures 12, 13:
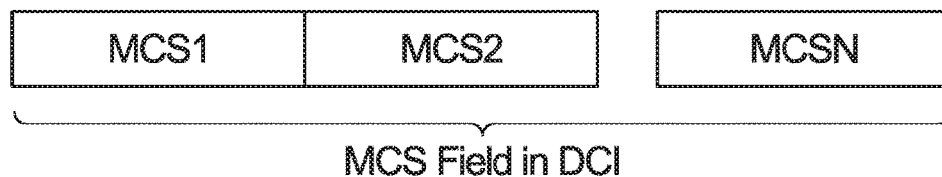

FIG. 12 is a block diagram illustrating an example of modulation order information in a modulation and coding scheme (MCS) field included in DCI according to an aspect of the disclosure.

FIG. 13 is a table illustrating MCS patterns and associated configuration indices according to an aspect of the disclosure.

Figures 14, 15:

FIG. 14 is a block diagram illustrating an example of a demodulation reference signal (DMRS) sequence initialization indication in a DMRS field included in DCI according to an aspect of the disclosure.

FIG. 15 is a table illustrating DMRS sequence initialization indication patterns and associated configuration indices according to an aspect of the disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of the present disclosure provide mechanisms to inform an electronic device, such as a user equipment (UE), of multiple QCL information, thereby allowing a repetition of physical downlink shared channel (PDSCH) information to be transmitted from multiple transmit receive points (TRPs) or beams from one or more TRPs. More generally, the present disclosure provides mechanisms to inform the UE of various different transmission parameters used for configuring the UE for receiving a repetition of PDSCH information from multiple TRPs. Other types of transmission parameters may include redundancy version, modulation order and demodulation reference signal (DMRS) initialization. Several different processes are disclosed for informing the UE of the transmission parameters. In the particular case of QCL information, the QCL relationships can be associated with transmission configuration indication (TCI) states, each TCI state associated with a respective TRP (or beam) or respective RS and DMRS antenna port (or port group), or both, and the TCI states are provided to the UE. In another case, a TCI state is configured with parameters that define the QCL information. With different QCL information in different TCI states, each TCI state can be associated with a different TRP or beam. In some embodiments, different QCL information can be defined in one TCI state, and each QCL information can be associated with a different TRP or beam. In some embodiments, the TCI states can be provided to the UE using dynamic signaling by downlink control information (DCI). In some embodiments, the TCI states can be provided to the UE using a combination of semi-static signaling and dynamic signaling, for example using DCI. Two particular examples of semi-static signaling are radio resource control (RRC) signaling and a combination of RRC signaling together with a media access control (MAC) control element (CE). The combination of semi-static signaling and dynamic signaling may include providing the UE predefined configurations of TCI states or DMRS ports/port groups, or both, using higher layer signaling. The higher layer signaling may include RRC or RRC and MAC CE and then a particular configuration can be selected from the predefined configurations by dynamic signaling using the DCI. In some embodiments predefined associations between TCI states, or port or port groups, and transmission parameters, such as QCL information, are known to the UE or are provided to the UE by RRC higher layer signaling.

The following paragraphs provide context in the form of the description of an overall system that includes both base stations and electronic devices served by the base stations.

Figure 1:
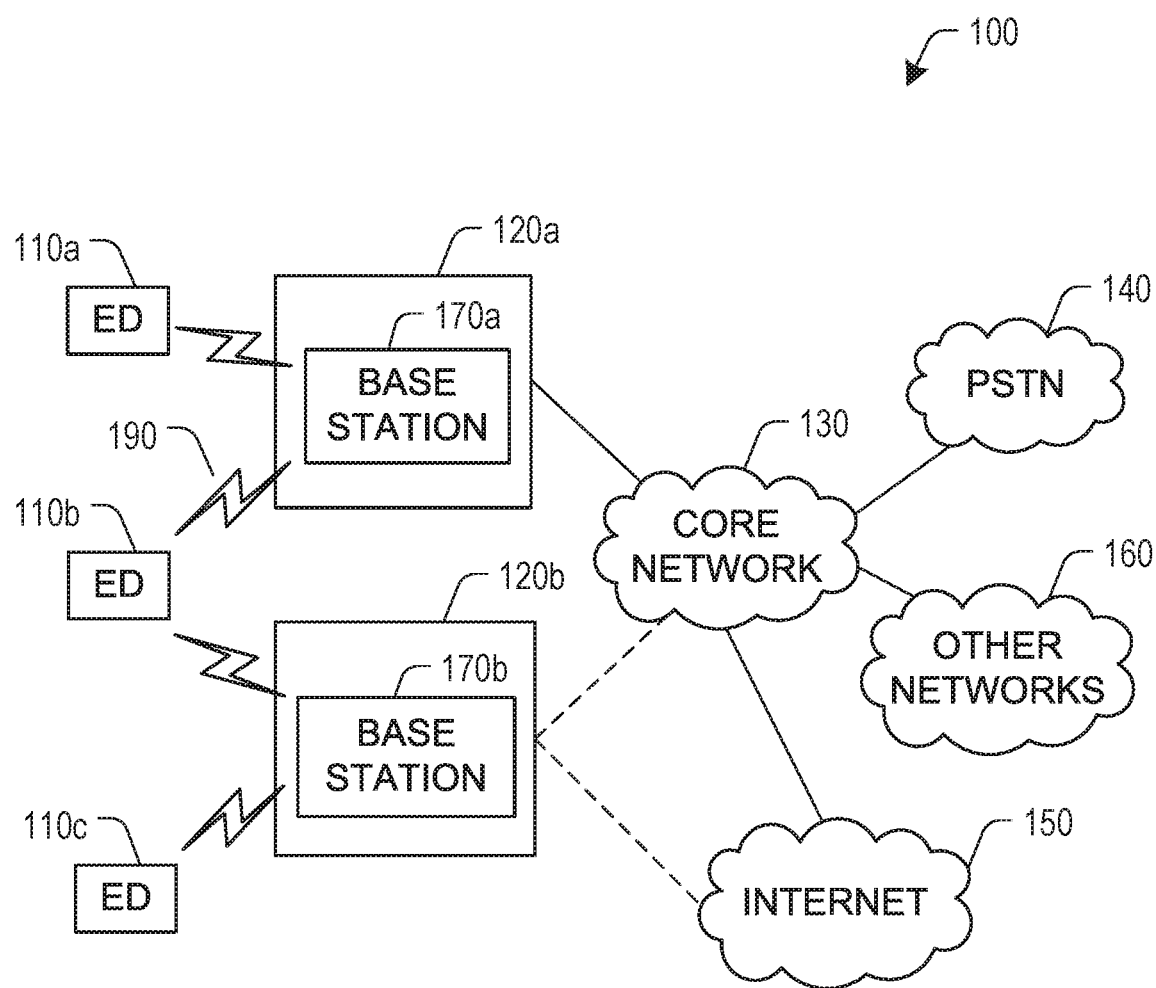
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a and 120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a, 110b and 110c are configured to operate in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a and 120b include base stations 170a and 170b, respectively. Each base station 170a and 170b is configured to wirelessly interface with one or more of the EDs 110a, 110b and 110c, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a, 110b and 110c may be alternatively or additionally configured to interface, access, or communicate with any other base station 170a and 170b, the internet 150, the core network 130, the PSTN 140, the other networks 160, or any combination of the preceding. The communication system 100 may include RANs, such as RAN 120b, wherein the corresponding base station 170b accesses the core network 130 or the internet 150, as shown.

The EDs 110a, 110b and 110c and base stations 170a and 170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), and/or relay nodes. The functions of any base station 170a and 170b may be localized to a single location, as shown, or be distributed within the network, such as distributed in the corresponding RAN. Also, the base station 170b forms part of the RAN 120b, which may include other base stations. Each base station 170a and 170b transmits and/or receives wireless signals within a particular geographic region or area, sometimes referred to as a "cell" or "coverage area". A cell may be further divided into cell sectors, and a base station 170a and 170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a and 120b shown is exemplary only. Any number of RAN may be contemplated when devising the communication system 100.

The base stations 170a and 170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a and 170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HSPA (HSPA+) optionally including High Speed Downlink Packet Access (HSDPA), High Speed Packet Uplink Access (HSUPA), or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a and 120b are in communication with the core network 130 to provide the EDs 110a, 110b and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a, 110b and 110c or both, and (ii) other networks (such as the PSTN 140, the internet 150, and the other networks 160). In addition, some or all of the EDs 110a, 110b and 110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP and UDP. EDs 110a, 110b and 110c may be multimode devices capable of operation according to multiple radio access technologies, and incorporate multiple transceivers necessary to support such.

In embodiments of the present invention, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110a, 110b and 110c of FIG. 1 include different types of devices having different capabilities and requirements. More specifically, each ED 110a, 110b and 110c may be associated with a different traffic type having particular requirements for QoS, latency, throughput, simultaneous connections, etc. Example EDs 110a-110c associated with different traffic types may include a smartphone, a computer, a television, a security camera, a sensor, a thermostat, a heart rate monitor, etc. In a particular example, ED 110a is a computer, ED 110b is a sensor, and ED 110c is a heart rate monitor. Each of the EDs 110a, 110b and 110c may have different wireless communication capabilities and requirements.

Furthermore, in a heterogeneous communications system, the base stations 170a-170b may communicate with one or more of the EDs 110a, 110b and 110c over one or more software-configurable air interfaces 190 using wireless communication links. The different radio access network devices (e.g., base stations 170a and 170b) and electronic devices (e.g., ED 110a, 110b and 110c) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

In fifth generation (5G) New Radio (NR), different devices and services are expected to have different requirements for wireless communication. For example, some devices may require low-latency communication (e.g., less than 0.5 ms round trip) with high reliability (e.g., less than $10^{-5}$ block error rate (BLER)). These devices are proposed to communicate in a framework sometimes known as ultra-reliable low-latency communication (URLLC). URLLC may be unpredictable and sporadic in nature, and may not require a high data rate depending on the application. URLLC may be used in either uplink (UL) or downlink (DL), and may be particularly applicable in cases such as vehicle-to-vehicle (V2V) communication for coordinating automobile traffic.

To satisfy the latency and reliability requirements of URLLC communication, a number of features are proposed that differ from conventional Long Term Evolution (LTE) communication and from NR enhanced mobile broadband (eMBB) communication.

In some examples, a portion of network resources, for example time-frequency resources such as one or more bandwidth parts (BWPs), is reserved for URLLC traffic and a different portion of network resources is reserved for eMBB traffic. Network resources that are used for URLLC traffic may be configured to increase flexibility or reduce latency, for example by having a finer granularity or periodicity of scheduling than the slot-based scheduling of eMBB, or a shorter minimum duration. URLLC transmissions in the physical downlink shared channel (PDSCH) or the physical uplink shared channel (PUSCH) may be as short as two symbols. The first symbol of an URLLC transmission may include a demodulation reference signal (DMRS).

In order to increase the reliability of URLLC transmissions in a downlink (DL) direction, a URLLC transmitter may be configured to transmit k repetitions of a URLLC transmission, where k is an integer greater than one. The value of k may be configurable, for example by higher-layer signaling (e.g., radio resource control (RRC) signaling). The k repetitions consist of an initial transmission and k−1 retransmissions of either the initial transmission or a different redundancy version (RV) of the initial transmission. To mitigate the latency associated with retransmissions, the URLLC transmitter may transmit all k repetitions without waiting for or receiving HARQ feedback from the URLLC receiver, e.g. consecutively in time. The k repetitions are transmitted irrespectively of whether previous repetitions of the URLLC transmission were successfully received. The k repetitions may be transmitted on the same frequency resources, e.g. the same bandwidth part, or may use frequency hopping so that not all of the k repetitions are transmitted on the same frequency resources. In some embodiments, one or more of the k repetitions may be transmitted in frequency resources for eMBB traffic, in which case these repetitions may preempt eMBB traffic.

Figure 2:
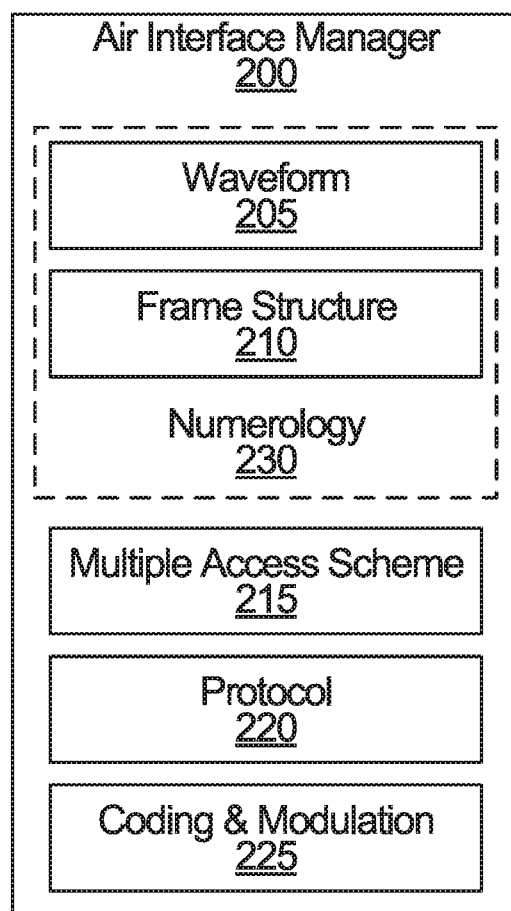
FIG. 2 is a block diagram of an air interface manager for configuring a software-configurable air interface.

FIG. 2 illustrates a schematic diagram of an air interface manager 200 for configuring a software-configurable air interface 190. Air interface manager 200 may be, for example, a module comprising a number of components or building blocks that define the parameters of the air interface 190 and collectively specify how a transmission is to be made and/or received by the air interface 190.

The components of the air interface manger 200 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, ITU). The frame structure component may also specify whether the time slot is a configurable multi-level TTI, a fixed TTI, or a configurable single-level TI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 may include a numerology component 230 defining a number of air interface configuration parameters, such as the sub-carrier spacing, CP length, symbol length, slot length, and symbols per slot.

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 600 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs, contention-based shared channel resource, non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

Because an air interface comprises a plurality of components or building blocks, and each component may have a plurality of candidate technologies (also referred to herein as air interface capability options), to the air interface manager 200 may configure and store a large number of different air interface profiles, where each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 200 and used for communications between the pair of communicating transmitting-receiving devices.

In further embodiments, the air interface manager 200 may modify or update its components, profiles, or capability options. For example, the air interface manager 200 may replace the waveform and frame structure components 205, 210, with a single numerology component 230. Conversely, the air interface manager 200 may separate the coding and modulation component 225 into an individual coding component and an individual modulation component. Furthermore, the air interface manager 200 is configurable such that new soft air interface configuration components developed in the future should be able to be utilized.

The air interface manager 200 may also update certain components to modify the capability options of any given component. For example, the air interface manager 200 may update the modulation and coding component 225 to include higher-order modulation schemes.

By updating the stored components, profiles, and candidate options, the air interface manager 200 can flexibly adapt to better accommodate diverse wireless traffic types and services. Modifying or updating components, profiles, and candidate options may allow the air interface manager 200 to provide suitable air interface profiles for traffic types or services other than those already contemplated for ultra-reliable low latency communications (URLLC), enhanced mobile broadband (eMBB), and massive machine-type communications (mMTC).

Figure 3A:
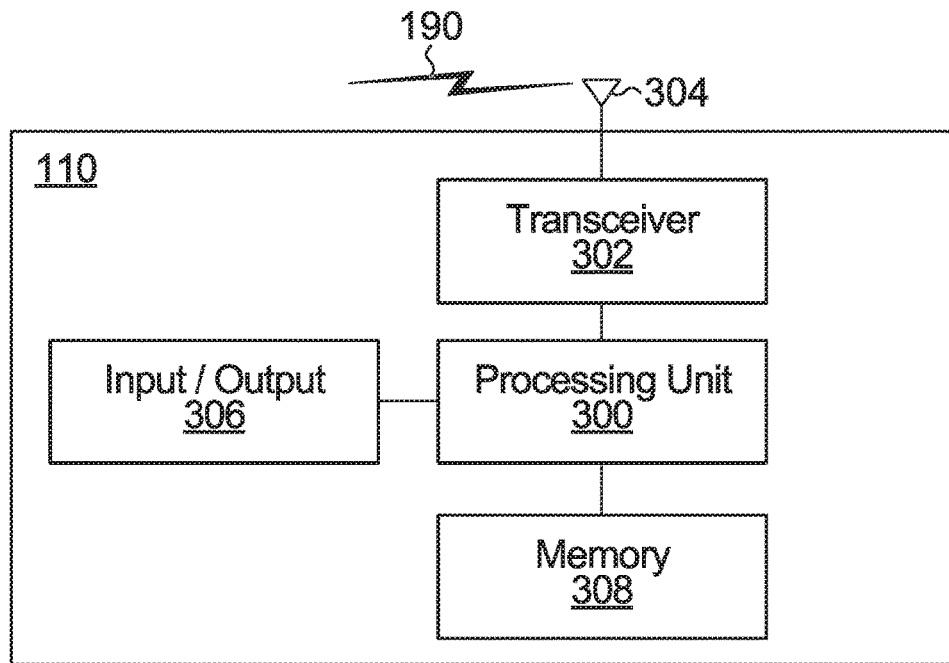
FIG. 3A is a block diagram of an example client side electronic device.
Figure 3B:
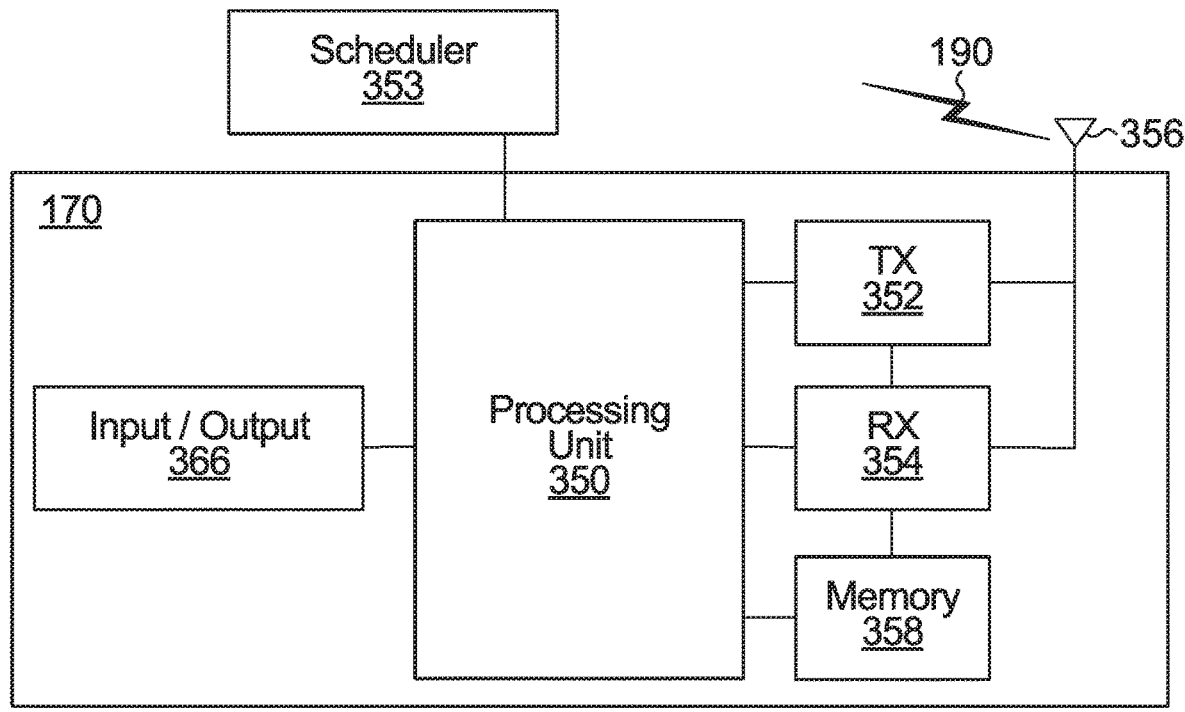
FIG. 3B is a block diagram of an example radio access network device.

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 300. The processing unit 300 implements various processing operations of the ED 110. For example, the processing unit 300 could perform signal coding, data processing, power control, input/output processing, or any other functionality enabling the ED 110 to operate in the communication system 100. The processing unit 300 may also be configured to implement some or all of the functionality and/or embodiments described in more detail above. Each processing unit 300 includes any suitable processing or computing device configured to perform one or more operations. Each processing unit 300 could, for example, include a microprocessor, microcontroller, digital signal processor, field programmable gate array, or application specific integrated circuit.

The ED 110 also includes at least one transceiver 302. The transceiver 302 is configured to modulate data or other content for transmission by at least one antenna 304 or Network Interface Controller (NIC). The transceiver 302 is also configured to demodulate data or other content received by the at least one antenna 304. Each transceiver 302 includes any suitable structure for generating signals for wireless or wired transmission and/or processing signals received wirelessly or by wire. Each antenna 304 includes any suitable structure for transmitting and/or receiving wireless or wired signals. One or multiple transceivers 302 could be used in the ED 110. One or multiple antennas 304 could be used in the ED 110. Although shown as a single functional unit, a transceiver 302 could also be implemented using at least one transmitter and at least one separate receiver.

The ED 110 further includes one or more input/output devices 306 or interfaces (such as a wired interface to the internet 150). The input/output devices 306 permit interaction with a user or other devices in the network. Each input/output device 306 includes any suitable structure for providing information to or receiving information from a user, such as a speaker, microphone, keypad, keyboard, display, or touch screen, including network interface communications.

In addition, the ED 110 includes at least one memory 308. The memory 308 stores instructions and data used, generated, or collected by the ED 110. For example, the memory 308 could store software instructions or modules configured to implement some or all of the functionality and/or embodiments described above and that are executed by the processing unit(s) 300. Each memory 308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 350, at least one transmitter (TX) 352, at least one receiver (RX) 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more EDs or other devices. Each receiver 354 includes any suitable structure for processing signals received wirelessly or by wire from one or more EDs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the ED 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

As described above, downlink control information (DCI) is transmitted in a PDCCH from the radio access network device, such as a base station, to the ED to provide the ED with information about specific physical layer parameters such as scheduling of downlink or uplink data, and other configuration parameters. The DCI may be transmitted using different DCI formats, which are designed for different purposes. Table 1 below shows examples of two different DCI formats used for scheduling of Physical Downlink Shared Channel.

TABLE 1

| DCI formats | |
|---|---|
| DCI format | Usage |
| 1_0 | Scheduling of PDSCH in one cell |
| 1_1 | Scheduling of PDSCH in one cell |

DCI format 1_0 is known as a "fallback" DCI format for scheduling of downlink data. Fallback DCI formats are intended for use in performing basic radio link set up or reconfiguration. They may include less information, e.g. the minimum amount of information to allow basic radio link set up or reconfiguration to occur. DCI format 1_1 is known as a "non-fallback" DCI format for scheduling of downlink data. Although embodiments of the present application may be described below with specific reference to certain types of non-fallback and fallback DCI, it should be understood that more generally, aspects of the disclosure can be used with many different types of DCI. A particular additional DCI format may include a "compact" DCI that has a smaller payload size by using fewer fields and/or using fewer payload bits per field and thus fewer overall payload bits. In such a compact DCI, there may be fields containing the TCI pattern configuration, AP pattern configuration or combined TCI pattern and AP pattern configuration, that would be smaller than the corresponding fields in a DCI having format 1_1 or 1_0.

A DCI format generally includes a set of parameter fields, each having a defined bit length. In the description that follows, contents of the DCI may be referred to as fields or indications. Regardless of the terms that are used for transmission within the DCI, it should be understood that what is being described as the contents of the DCI would be consistent with how a DCI is formatted and transmitted between the radio access network device and UE.

As agreed upon in R15, TS38.214 states that a UE can be configured with a list of up to M TCI-State configurations within the higher layer parameter PDSCH-Config to decode PDSCH according to a detected PDCCH with DCI intended for the UE and the given serving cell, where M depends on the UE capability. Each TCI-State contains parameters for configuring a quasi co-location (QCL) information between one or two downlink reference signals and the DM-RS ports of the PDSCH. The QCL information is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS is given by the higher layer parameter qcl-Type in QCL-Info and may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}.

In the agreed upon version of R15 there cannot be two QCL informations in one TCI state for single-layer transmission of PDSCH repetition due to a particular limitation in the agreed upon version of standard. In TS38.214 V15.1.0 (2018-03) it is disclosed that, "if the number of downlink phase tracking reference signal (DL PTRS) ports associated to a TC-state in DCI is set to 2, the scheduled number of PTRS ports is 2, and each PTRS port is associated with one DMRS port within the corresponding DMRS port group, and the UE does not expect to be scheduled with one DMRS port group". This means that one TCI state can include two PTRS ports, and potentially may contain two QCLs informations, if there are two DMRS port groups. Two DMRS ports can be in the same or different groups associated with the PTRS ports. The DMRS ports to be used can be signaled by an antenna port(s) field in the DCI.

Another aspect of the present application includes utilizing two downlink reference signals (DL RS) that can be any type of DL RS such as, but not limited to, phase tracking reference signal (PT-RS), channel state reference signal (CSI-RS) and synchronization signal block (SSB). The SSB is a part of SSB/physical broadcast channel (PBCH) block. In some embodiments, the DM-RS of PBCH can be considered as the DL RS. The two reference signals can be different ports/port groups of the same or different DL RS. M RS ports or port groups can be associated with K DMRS ports or port groups where M>K. There can be many to one mappings between RS ports port groups and a DMRS port or port group, to define M QCLs.

For the case of two DL RSs, the QCL types for the first DL RS and the second DL RS can be the same, if the DL RSs are associated with the same or different DMRS port(s) or port group(s) at different times.

Dynamic Signaling

Figure 4:
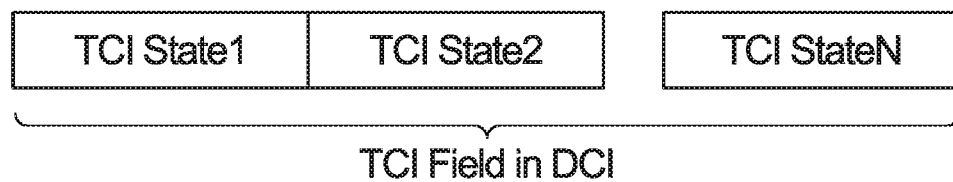
FIG. 4 is a block diagram illustrating an example of multiple transmission control indications (TCIs) in a TCI field included in downlink control information (DCI) according to an aspect of the disclosure.

In some embodiments, transmission configuration indication (TCI) states that are associated with QCL information can be provided by the radio access network device to the UE using dynamic signaling by downlink control information (DCI). When using dynamic signaling via DCI, content of the DCI can include multiple TCI state indications, each indication associated with a particular TCI state. In some embodiments, the TCI state indications may collectively form a single TCI state field or be considered separate TCI fields, one for each TCI state of the DCI. Each TCI state indication can be k bits in length. The total number of bits for TCI field in the DCI is then equal to k*N, where N is the number TCI states in the DCI. FIG. 4 illustrates a representation of a portion of a DCI that includes N TCI state indications identified as "TCI state1" to "TCI stateN".

The number of TCI states may be less than, equal to, or greater than a number K, K being a total integer number of PDSCH repetitions. When a number of TCI states (N) is equal to a number of PDSCH transmissions (K), the first TCI state, indicated by a first k bits of the TCI field, is associated with the first PDSCH transmission, the second TCI state, indicated by the next k bits of the TCI field, is associated with the first PDSCH repetition, and so on. The Nth TCI state corresponds to the Kth PDSCU repetition.

When the number of TCI states (N) is less than the number of PDSCH transmissions (K), a pattern of the N TCI states can be repeated until the K repetitions have finished. If the number of K transmissions is evenly divisible by the N TCI states, an integer number of repetitions of the pattern results. If not, a fractional number of repetitions of the pattern results. For example, if K=4 repetitions and N=2 TCI states, then the first, second, third and fourth PDSCH repetitions are associated with TCI states 1, 2, 1 and 2, respectively. It is also possible that the first, second, third and fourth PDSCH repetitions are associated with TCI states 1, 1, 2 and 2, respectively. In some embodiments, the pattern can be signaled to the UE using RRC signaling. In some embodiments, the UE may be configured with a behavior or a rule that in conjunction with knowledge of the number of repetitions and the number of TCI states, the UE will use a set pattern based on the behavior.

When the number of TCI states (N) is greater than the number of transmissions (K), the TCI states can be applied to the respective repetitions, such that only K of the N TCI states are used.

In some embodiments, a same TCI state is used for more than one repetition of a set of repetitions. In some embodiments, the TCI state is different for each repetition.

When including the TCI states in the DCI, additional bits may be used in the DCI to accommodate the additional TCI state indications that are not present in existing DCI formats. Then UE can be pre-configured with knowledge of the number of TCI state indications or notified of the number, i.e. N, and in conjunction with knowledge of how many bits are in each TCI indication, the UE will know how many additional bits are being used for the TCI state indications and thus the overall size of the DCI. This may include creating a new configuration parameter or modifying an existing configuration parameter to enable the existing configuration parameter to provide the relevant information to the UE. An example of an existing configuration parameter is tci-PresentInDCI in ControlResourceSetcan. An example of modifying the tci-PresentInDCI parameter may include indicating in the DCI a number of configured TCI states in the form {n0, n1, n2, n4}, where n0, n1, n2, n4 indicate there are zero, one, two or four TCI states, respectively. In some embodiments, the UE may be notified by higher layer signaling as part of the PDSCH configuration.

There is a functional limitation on a maximum number of TCI states. In some embodiments, there may be a maximum of 64 TCI states and a maximum of 8 TCI states can be activated or deactivated by the DCI at a given time. Activated TCI states can be modified or released. TCI states can be activated, modified or deactivated using RRC signaling or MAC-CE, or both. The use of RRC signaling or MAC-CE enables the list of TCI states to be changed as necessary. If the list of TCI state changes frequently due to a change of signal beams or TRPs, e.g. from UE movement, it may be advantageous to use MAC-CE instead of RRC signaling because MAC-CE may be able to more quickly configure the UE. In some embodiments, the number of TCI states is configurable. Configuring the number of active TCI states, and in some instances, the value of the TCI states, could be performed by RRC signaling or pre-defined based on DCI formats.

Figure 5:
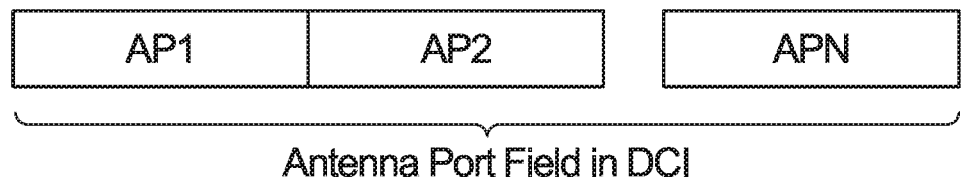
FIG. 5 is a block diagram illustrating an example of multiple antenna port (AP) indications in an AP field included in DCI according to an aspect of the disclosure.

In another embodiment, an antenna port indication can be added to the DCI or an existing antenna port field in the DCI can be modified to accommodate a number (N') of sets of antenna port(s) or antenna port group(s) associated with multiple repetitions of the PDSCH. Whenever antenna ports are referred to herein, it should be understood than this may also include antenna port groups. FIG. 5 illustrates a representation of a portion of a DCI that includes N' antenna port indications identified as AP1 to APN'.

In some examples, the number N of TCI states is the same as the number N' of antenna ports or antenna port groups, in which case the value of N' does not need to be explicitly signaledIn such a case there is one-to-one mapping between antenna port indications and TCI states, i.e. AP1 to TCI state 1, AP2 to TCI state 2, and so on.

When N' is less than N, a new antenna port to TCI state association can be defined. If there is only a single antenna port or antenna port group, then the single port associates with the first TCI state for the first PDSCH transmission and the next TCI state in the DCI for the second transmission, and so on.

When the number of antenna ports N' is greater than one, but less than the number of TCI states N, then an association rule for the antenna port(s) or antenna port group(s) and the TCI states and UE behavior can be defined and provided to the UE. In a particular example in which the number of antenna ports (P) is equal to 2 and the number of TCI states (N) equal 4, for example, the first, second, first and second antenna ports associate with the for first, second, third and fourth PDSCH transmissions and the first, second, third and fourth TCI states associate with the first, second, third and fourth PDSCH transmissions. It is to be understood that there can be many different many-to-one mappings of antenna port(s) or antenna port group(s) and repeated PDSCH transmissions.

When N' is different from N, the association or mapping rule between TCI states and antenna port(s) or antenna port group(s) can be based on a pre-configured and known to the UE association or signaled via RRC signaling.

By allowing multiple TCI states and/or antenna port sets to be indicated to the UE in the DCI, patterns of TCI states associated with different PDSCH transmissions can be signaled to the UE dynamically. Similarly, the patterns of antenna port sets associated with different PDSCH transmissions can be signaled to the UE dynamically. The signaling of the patterns of either TCI states or antenna port sets allows choices of TRPs/beams for different PDSCH transmissions to change or adapt with changes in channel conditions.

Combined Semi Static and Dynamic Signaling

In some embodiments, the TCI states and/or antenna port(s) or antenna port group(s) are signaled to the UE using a combination of semi-static signaling (RRC or RRC+MAC CE) and dynamic signaling using DCI. Higher layer signaling can be used to define a list of TCI pattern configurations, a list of antenna port pattern configurations or a list of combined TCI state and antenna port pattern configurations.

In some embodiments, the list of TCI state pattern configurations, antenna port pattern configurations or combined TCI state and antenna port pattern configurations can be signaled by RRC signaling. In some embodiments, RRC signaling can be used to provide the list of TCI state pattern configurations, antenna port pattern configurations or combined TCI state and antenna port pattern configurations, and then media access control (MAC) control elements (CE) can be used to activate a subset of the list of pattern configurations.

Figures 6C, 7:
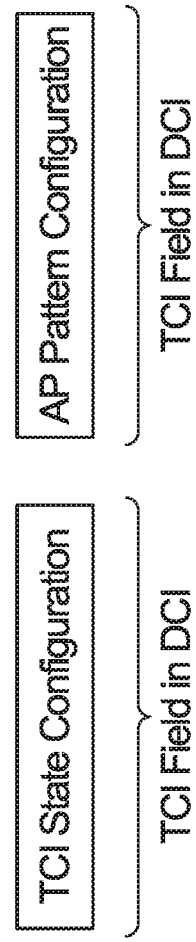
FIG. 6C is an example table illustrating combined TCI state patterns and AP patterns with associated configuration indices according to an aspect of the disclosure.
FIG. 7 is a block diagram illustrating an example of TCI state configuration information in a TCI field and AP pattern configuration information in an AP field that are included in DCI according to an aspect of the disclosure.

Examples of lists of TCI state pattern configurations, antenna port pattern configurations, and combined TCI state and antenna port pattern configurations are shown in the tables of FIGS. 6A, 6B and 6C.

Referring to FIG. 6A, each row of the table in FIG. 6A includes a TCI state pattern and an associated TCI configuration index. The TCI states in the pattern are identified by particular identifiers, i.e. TCIStateID #, where the ID # can be from all defined TCI states or only active TCI states. In a particular example, there are a total of 30 TCI states defined, and the ID can range from 0 to 29. TCI states can only be selected from a subset of active TCI state IDs. In an example where there are 30 TCI states, and 8 activated TCI states, then the TCI state ID can be 0 to 7. The TCI state ID 0 may associate with the lowest active TCI state ID from the 30 total TCI states, and so on. A first row of the table includes a TCI configuration index equal to "o" and a TCI state pattern including TCIStateID1 and TCIStateID2. A second row of the table includes a TCI configuration index equal to "1" and a TCI state pattern including TCIStateID2 and TCIStateID3. A third row of the table includes a TCI configuration index equal to "2" and a TCI state pattern including TCIStateID1, TCIStateID3 and TCIStateID2. A fourth row of the table includes a TCI configuration index equal to "3" and a TCI state pattern including TCIStateID1, TCIStateID1, TCIStateID2 and TCIStateID2. The index associated with the TCI state pattern described above could be coded in the DCI. The DCI bit field size can be fixed or ceil(log 2(# TCI pattern configurations)). For example, if the number of active patterns is 8, the bit field size would be three and the coded value in the DCI would range from 000 to 111.

FIGS. 6B and 6C include similar tables of four patterns, each pattern with an associated configuration index. The table of FIG. 6C includes pairs of TCI state pattern and AP pattern, each pair having an associated configuration index.

It is to be understood that the example tables shown in FIGS. 6A, 6B and 6C are not intended to be any way limiting. The number of TCI states or AP values in a pattern can vary from 1 to M, where M is a maximum number of TCI states or AP values that are allotted for a pattern. Any combination, arrangement or repetition of TCI states or AP values could be included in a respective TCI state or AP value pattern. Although the tables in FIGS. 6A, 6B and 6C, each have only 4 rows in the respective tables, it is to be understood that there could be more or fewer rows in the table.

In some embodiments, the UE may be pre-configured with lists of TCI state pattern configurations, antenna port pattern configurations, or combined TCI state and antenna port pattern configurations. In such embodiments, neither RRC signaling nor RRC signaling and MAC CE are utilized. In some embodiments, the UE may be pre-configured with a TCI state pattern configuration, antenna port pattern configuration, or combined TCI state and antenna port pattern configuration, or provided with such information using higher layer parameters. When referring to the UE being pre-configured in information such as lists of TCI state pattern configurations, antenna port pattern configurations, or combined TCI state and antenna port pattern configurations, it is to be understood that the information may be from an agreed upon telecommunication standard that identifies particular lists. In such embodiments, where the UE is pre-configured with information, the DCI is used to select one of the pre-configured options.

In some embodiments, the UE may be provided with a list of TCI pattern configurations, a list of antenna port pattern configurations or a list of combined TCI state and antenna port pattern configurations using a higher layer parameter. In such embodiments, where the UE is configured with information by a higher layer parameter, the DCI is used to select one of the configured options. In some embodiments, new higher layer parameters can be included with an existing set of configuration parameters used for configuring the PDSCH to make a list of TCI pattern configurations, by adding/modifying/releasing a TCI pattern configuration. In some embodiments, new higher layer parameters can be included with an existing set of configuration parameters used for configuring the other channels in addition to the PDSCH, to make a list of TCI pattern configurations, by adding/modifying/releasing a TCI pattern configurations. In some embodiments, a new higher layer parameter can be included with an existing set of configuration parameters used for configuring the PDSCH to notify UE on the existent of a list of TCI pattern configurations.

In some embodiments, an existing higher layer parameter could be modified to include a notification that a list of TCI pattern configurations is being used to define a TCI pattern, enabling the UE to interpret the TCI field in DCI as a TCI pattern configuration, not as a TCI state. In some embodiments, an existing higher layer parameter could be modified to include a notification that a list of antenna port pattern configurations is being used to define an AP pattern, enabling the UE to interpret the AP field in DCI as a AP pattern configuration, not as a AP port. In some embodiments, an existing higher layer parameter could be modified to include a notification that a list of combined TCI state and antenna port pattern configurations is being used to define a combined TCI pattern and AP pattern, enabling the UE to interpret the TCI field or AP field, or both, in DCI as a combined TCI pattern and AP pattern configuration, not as a TCI or AP state. An example of an existing higher layer parameter that could be modified is tci-PresentInDCI. The tci-PresentInDCI parameter could be modified to notify the UE using several different variables that include None, TCIState, TCIConfig, TCI/APConfig, TCI/APConfigWithAPfield. For the case of tci-PresentInDCI being equal to "None", this indicates that there is no TCI information the DCI. For the case of tci-PresentInDCI being equal to "TCIState", this means that the configuration of the TCI state is consistent with a pre-existing configuration, such as that accepted in R15. For the case of tci-PresentInDCI being equal to "TCIConfig", the TCI field value in the DCI is equal to an index defining a particular TCI state pattern and the antenna port field value is equal to a particular index defining a particular antenna port pattern. The particular indices may correspond a row of the TCI state pattern list and a row in the antenna port pattern list, respectively. In some embodiments, the particular indices may correspond to a row or an element number (index) of a list of activated TCI state pattern configurations or a row or an element number (index) in a list of activated antenna port patterns or a row or an element number of a combined list of TCI state pattern configurations and activated antenna port patterns. This may be the case when using RRC signaling and MAC CE.

For the case of tci-PresentInDCI being equal to "CI/APConfig" the TCI field value in the DCI may be equal to an index defining a particular combined TCI state pattern and antenna port pattern configuration, for example a row of the combined TCI state pattern and antenna port pattern configuration list. However, the antenna port field in the DCI is disabled and thus has zero bits.

For the case of tci-PresentInDCI being equal to "TCI/APConfigWithAPfield" the antenna port field value in the DCI is equal to an index defining a particular combined TCI state pattern and antenna port pattern configuration, for example a row of the combined TCI state pattern and antenna port pattern configuration list. However, in this case, the TCI field in the DCI is disabled and thus has zero bits. A benefit of this alternative over the previous alternative is that the antenna port field in the conventional DCI has a larger number of bits than the TCI field and can therefore support additional configurations.

A list of TCI state pattern configurations, antenna pattern configurations or combined TCI state pattern and antenna port pattern configurations can be provided to the UE by RRC signaling alone or by RRC signaling and activating or deactivating particular configurations using MAC CE.

The DCI can be used to provide the UE with a selection of the TCI state pattern, the AP pattern, or the combined TCI state pattern and AP pattern configuration, by RRC signaling, or provided by RRC signaling and then activated with MAC CE. The UE can interpret the contents of the TCI field in the DCI to be a TCI state pattern based upon a TCI state pattern configuration index or can interpret the contents of the AP field in the DCI to be an AP pattern based upon an AP pattern configuration index. FIG. 7 illustrates an example of a TCI state pattern configuration in a TCI field of a DCI and an AP pattern configuration in an AP field of a DCI.

A TCI state pattern configuration index or an AP pattern configuration can be a row in a list, providing information on a TCI state pattern or AP pattern, or both, to be used in PDSCH repetitions. If the pattern length is shorter than a number of PDSCH repetitions, then the pattern is repeated. If the pattern length is longer than a number of repetitions, than a number less than the pattern length of TCI states or AP values, i.e. a number equal to the number of repetitions, is used of the TCI state pattern or AP pattern. If the combined TCI state pattern and AP pattern configurations are used, only either AP value or TCI state are provided in the DCI. This information is signalled to the UE by RRC signalling based on the lone field being used in the DCI, either AP field or TCI state field. For example, if the AP field is being used to signal the combined TCI state pattern and AP pattern configuration, then the tci-PresentInDCI parameter is disabled so that no TCI information is included in the DCI. In some embodiments, a higher layer parameter can be used to notify whether or not the AP pattern is present, e.g. AP-PresentInDCI, which could be similar to the operation of tci-PresentInDCI, but for indicating that an AP field is present in the DCI.

The size of the DCI in terms of bitwidth can also vary based on the number of the TCI state pattern configurations, the number of active TCI state pattern configurations or AP pattern configurations, or the number of active AP pattern configurations, in the list of TCI state pattern configurations or AP pattern configurations. For example, the bitwidth equals $\log_2(I)$, where I is the number of the TCI state pattern configurations or AP pattern configurations in the list of TCI state pattern configurations or AP pattern configurations.

The TCI state field in DCI should be interpreted by the UE as a TCI state pattern configuration when either there is RRC signaling of the pattern configuration or the UE is pre-configured with a selection of TCI state patterns. Similarly, the antenna port field in the DCI should be interpreted as an antenna port pattern configuration when either there is RRC signaling of the pattern configuration or the UE is pre-configured with a selection of AP patterns.

If a combined TCI state pattern and antenna port pattern configuration is used, then the UE may interpret using either the TCI field in the DCI or the antenna port field in the DCI. In some embodiments, if both fields are available to the UE, the AP field may take priority and TCI field can be discarded, or if both exist, the TCI filed can take priority and the antenna port field can be discarded.

By combining higher layer signaling and DCI, it may be possible to reduce signaling overhead while providing the flexibility of having dynamic signaling to adapt to changing channel conditions.

Predefined Set of Indications Either Known to the UE or Signaled Using Higher Layer Signaling In some embodiments, the UE can be pre-configured with a set of multiple TCI state patterns. The UE can then be provided with a selection of a particular one of the TCI state patterns from the pre-configured set using the DCI.

In some embodiments, the AP pattern can be provided to the UE using the DCI to provide AP pattern notification. Multiple AP patterns can be provided to the UE using RRC signaling (or RRC signaling and MAC CE) and then the DCI can provide the UE with AP pattern selection information to select a particular pattern. In some embodiments, a higher layer parameter could be used as part of an AP configuration. In some embodiments, a parameter that indicates that there is a TCI field in the DCI could indicate that there is no TCI information per se, but does indicate there is AP pattern configuration information in the DCI that can be used by the UE.

In some embodiments, a TCI state pattern is provided to the UE without using the DCI to provide TCI state information. The TCI state pattern may be a pre-configured set of activated TCI states of which the UE has knowledge. The TCI state pattern may be provided to the UE using a higher layer parameter as part of a PDSCH configuration. An example of a higher layer parameter could be "TCIStatepattern" which includes a string of TCI state identifiers to define a pattern such as "TCIStateID1", "TCIStateID2", and so on. For embodiments that do not use the DCI to provide TCI state information, tci-PresentInDCI would be disabled.

In some embodiments, an AP pattern can be provided to the UE without using the DCI to provide any AP pattern identification. The AP pattern may be pre-configured in the UE. The AP pattern may be provided to the UE using RRC signaling. A higher layer parameter in the CORESET configuration could be used to select a particular pattern of the pre-configured AP patterns known to the UE. A parameter that performs similar to tci-PresentInDCI could be used, called for example AP-PresentInDCI. For embodiments that do not use the DCI to provide TCI state information, tci-PresentInDCI would be disabled.

It is to be understood that although embodiments described above are described with regard to single layer transmission, the methodologies described can apply to multi-layer transmission. In such a scenario, for each repetition, there could be multiple layers, and for different repetitions different QCL information would be possible. In some embodiments, in the case of a multi-layer repetition, different data layers are received at the UE from different TRPs or beams.

It should also be understood that the repetitions can be slot based or non-slot based. Slot based means only a single repetition per slot. Non-slot based means multiple repetitions could occur within one slot, i.e. each repetition occurs in a mini-slot of the slot. In some embodiments, a repetition may occur across a slot boundary, for example over at least a portion of two slots.

It should also be understood that solutions described above, with reference to indications for TCI state, TCI state patterns, AP, or AP patterns being dynamically signaled, semi-statically and dynamically signaled, included in preconfigured associations or signaled in higher layer parameters could be used in combination, where appropriate. For example, in some embodiments, using RRC signaling (or RRC signaling and MAC CE) together with DCI to provide TCI state information to the UE can be used simultaneously with RRC signaling (or RRC signaling and MAC CE) to provide AP information to a given UE In other embodiments, using DCI for providing TCI state information to the UE can be used simultaneously with RRC signaling and MAC CE together with DCI to provide AP information to a given UE.

In some embodiments it is possible to overload a number of reference signal (RS) ports (P) with L layer transmission, where P and L are integers and P is greater than L. A non-limiting list of examples of different types of RS include phase tracking reference signal (ITRS), channel state information reference signal (CSI-RS), and synchronization signal block (SSB).

This overloading can be done by allowing P (greater than 1) downlink (DL) RS ports to be associated with one DMRS port group within a TCI-state.

Figure 8:
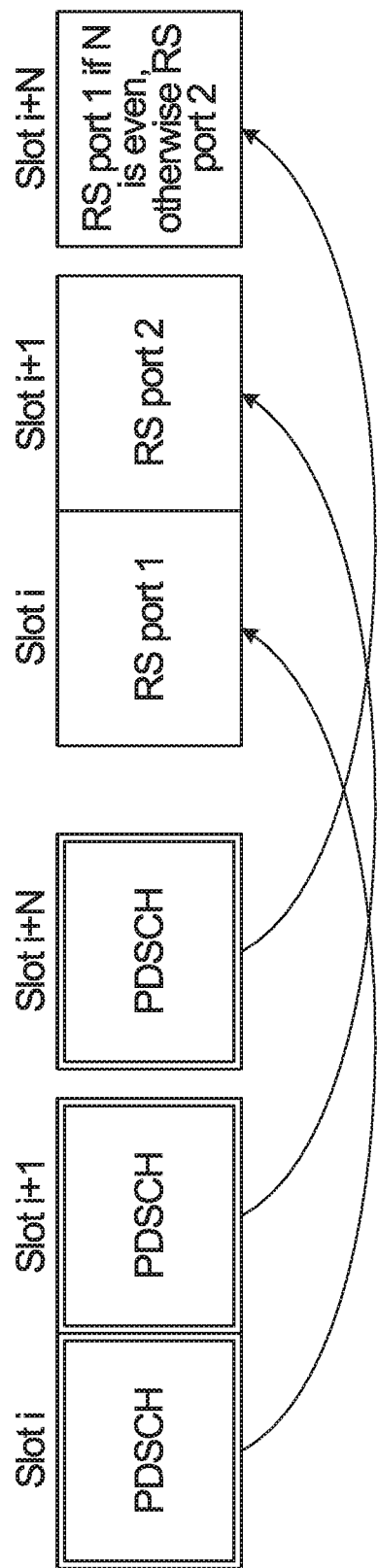
FIG. 8 is a block diagram illustrating an example of associations between physical downlink shared channel (PDSCH) repetitions and phase tracking reference signal (PTRS) ports in various slots according to an aspect of the disclosure.

FIG. 8 illustrates an example of how for a first PDSCH repetition in slot i, one or more DMRS ports in the DMRS port group are considered to be quasi co-located with a first DL RS port, for a second PDSCH repetition in slot i+1, the one or more DMRS ports in the DMRS port group are considered to be quasi co-located with the second DL RS port, and for an i+Nth PDSCH repetition in slot i+N, the one or more DMRS ports in the group are considered to be quasi co-located with the first DL RS port if N is even and the second DL RS port if N is odd.

For a situation in which the number of repetitions N is higher than the number of ports P, the association of DMRS ports and RS ports can be repeated.

Figure 9:
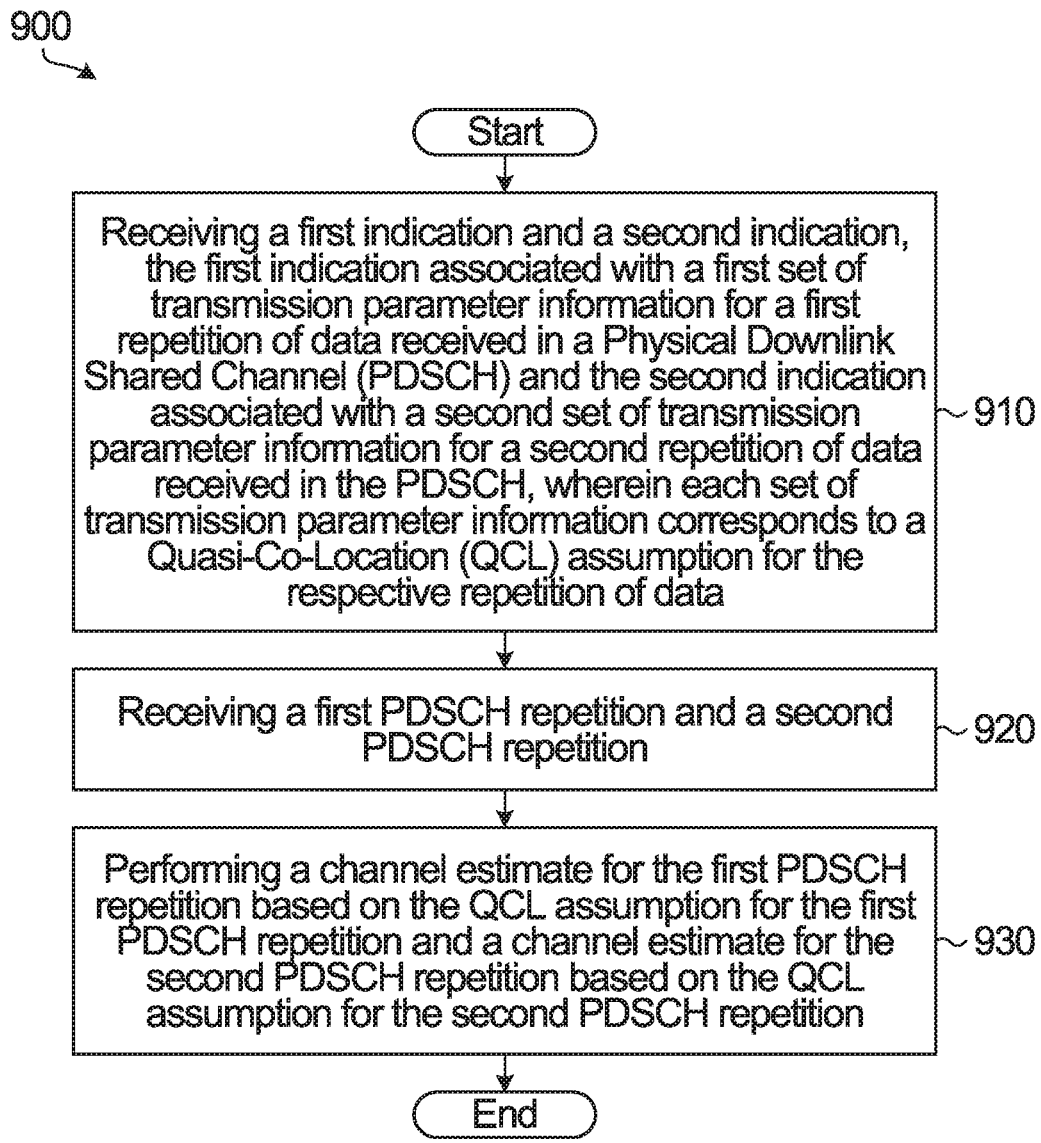
FIG. 9 is a flow chart describing a method for use by an electronic device (ED) in allocating a transmission resource.

FIG. 9 is a flow chart 900 that describes a method according to an aspect of the present application. The method is for implementation by a user equipment (UE), but more generally can apply to any of the ED described above.

Step 910 involves receiving a first indication and a second indication, the first indication associated with a first set of transmission parameter information for a first repetition of data received in a Physical Downlink Shared Channel (PDSCH) and the second indication associated with a second set of transmission parameter information for a second repetition of data received in the PDSCH. Each set of transmission parameter information corresponds to a Quasi-Co-Location (QCL) information for the respective repetition of data. The first indication and the second indication can be received by one of dynamic signaling using downlink control information (DCI), a combination of semi-static signaling and dynamic signaling or a predefined set of indications known to the UE or signaled using higher layer signaling.

The predefined fixed association may be specified for example in a telecommunications standard.

Step 920 involves receiving a first PDSCH repetition and a second PDSCH repetition.

Step 930 involves performing a channel estimate for the first PDSCH repetition based on the QCL information for the first PDSCH repetition and a channel estimate for the second PDSCH repetition based on the QCL information for the second PDSCH repetition.

When the first and second indications are received in a DCI, the DCI may have one of the following formats: format (1_0), also known as a fallback DCI; format (1_1), also known as a normal DCI; or format (1_1), but with a smaller than normal payload, which may be considered a compact DCI.

When receiving the first and second indications by dynamic signaling using DCI, the method may involve receiving a plurality of transmission configuration indications (TCIs), each TCI identifying a TCI state that indicates the QCL information for a respective PDSCH repetition. When the number of TCIs is equal to the total number of PDSCH repetitions, each TCI is associated with a respective PDSCH repetition.

When the number of TCIs is less than the total number of PDSCH repetitions, a pattern of TCIs associated with the PDSCH repetitions is repeated partially, or more than once, to correspond to the total number of PDSCH repetitions.

When the number of TCIs is greater than the total number of PDSCH repetitions, the TCIs are used in an order received for each PDSCH repetition until all of the PDSCH repetitions are received.

When receiving the first and second indications by dynamic signaling using DCI, the method may involve receiving a plurality of antenna port (AP) or AP group configuration indications, each AP or AP group configuration indication being associated with a TCI state that indicates a QCL information for a respective PDSCH repetition. When the number of AP or AP group configuration indications is equal to the number of TCI states, each AP or AP group configuration indication is associated with a respective TCI. When the plurality of AP or AP group configuration indications is less than a number of TCI states that are least two possible results. If there is only one AP or AP group configuration indication, the same AP or AP group configuration indication is used for each TCI state. If there is more than one AP or AP group configuration indication, an association between the more than one AP or AP group configuration indication and the TCI states is received. When the plurality of AP or AP group configuration indications is greater than a total number of PDSCH repetitions, the TCI states are configured in an order received for each respective PDSCH repetition until all of the PDSCH repetitions are received.

Receiving the first indication and the second indication using a combination of semi-static signaling and dynamic signaling may involve receiving a plurality of TCI state pattern configurations, a plurality of AP or AP group pattern configurations, or a plurality of combinations of TCI state pattern configurations and AP or AP group pattern configurations, by higher layer signaling. In some embodiments, an additional step may involve receiving a media access control (MAC) control element (CE) to activate at least one TCI state pattern configuration, at least one AP or AP group pattern configuration, or at least one combination of a TCI state pattern configuration and an AP or AP group pattern configuration.

When receiving the first indication and the second indication using a combination of semi-static signaling and dynamic signaling, the dynamic signaling may involve receiving an indication that a TCI state is included in a DCI to be received by the UE and receiving in the DCI at least one of several different types of indication. A first type of indication includes at least one indication of a TCI state for a respective PDSCH repetition. A second type of indication may include at least one indication of a TCI state pattern that indicates a particular TCI pattern configuration, an AP or AP group pattern that indicates a particular a AP or AP group pattern configuration, or at least one combination of a TCI state pattern configuration and an AP or AP group pattern configuration that indicates a particular TCI pattern configuration and AP or AP group pattern configuration.

In some embodiments, when the at least one indication is received in a TCI state field in the DCI, the at least one indication is an index of a table or list, the index associated with a particular TCI pattern configuration, a particular AP or AP group pattern configuration, or a particular combination of TCI state pattern and AP or AP group pattern configuration.

Receiving the first indication and the second indication can also involve receiving an identification of a TCI state pattern for identifying a particular TCI state pattern from a plurality of predefined TCI state patterns, each TCI state pattern identifying a set of TCI states, each TCI state corresponding to a QCL information for one of the PDSCH repetitions.

Receiving the first indication and the second indication can also involve receiving a plurality of AP or AP group pattern configurations by higher layer signaling. In some embodiments, an additional step may involve receiving a media access control (MAC) control element (CE) to activate at least one AP or AP group pattern configuration of the plurality of AP or AP group pattern configurations. After the plurality of AP or AP group pattern configurations are received by higher layer signaling, an indication that a TCI is included in a received DCI may be received. The DCI may include at least one indication of an AP configuration corresponding to an AP or AP group pattern, each AP or AP group pattern associated with TCI states for PDSCH repetitions.

Receiving the first indication and the second indication can also involve: receiving an antenna port (AP) pattern indication identifying a particular AP or AP group pattern from a plurality of predefined AP or AP group patterns, each AP or AP group pattern associated with a TCI state pattern for the PDSCH repetitions.

In some embodiments, each QCL information is associated with a respective reference signal (RS) port and the method further includes receiving the first PDSCH transmission or the at least one PDSCH repetition based at least in part on the QCL information associated with the respective RS port. When the RS ports are further associated with a demodulation reference signal (DMRS) port group and when using the DMRS ports of the DMRS port group, the QCL information for each DMRS port is considered to be equivalent to at least one of the RS ports. In such a scenario, multiple RS ports associated with a TCI state can be associated with at least one DMRS port/port group.

When receiving an indication of a first instance of a transmission parameter and a second instance of a transmission parameter, the first and second instances of the transmission parameters are each associated with a respective PDSCH repetition.

Solutions described above may be applicable for repetition transmissions in non-coherent joint transmission (NC-JT) in which different layers are transmitted from different TRPs based on only one DCI. This may include repetition using spatial multiplexing (SM)-like transmission or space-time block coding (STBC)-like transmission, if the second repetition includes another version of the same data as in the first repetition.

R15 currently supports two layers with two QCLs in one TCI state associated with two RS ports. It may be possible to utilize such a feature in a scenario in which subsequent transmissions are a version of the first transmission. The UE can be notified of TCI state information or AP information by a higher layer parameter, for example in the PDSCH configuration.

In some embodiments, the redundancy version (RV) pattern associated with different repetitions can be provided by RRC signaling together with DCI for uplink (UL) repetition in grant-based (GB) communications. For the case of UL grant free (GF) communication that subsequently changes to GB communication, in some embodiments, the RV pattern associated with different repetitions can be provided by RRC signaling together with DCI during the GB transmission. The RRC signaling can define multiple patterns, where a first RV of the RV pattern is used in a first repetition, the next RV in the RV pattern is used in the next repetition that is known to have a different RV, and so on. If the RV pattern length is shorter than the number of repetitions, then the RVs can be repeated for the repetitions in the order of the RV pattern as needed.

For a situation in which K RV patterns are considered, the RV pattern can be dynamically selected in the DCI using a bitwidth defined by a ceiling function for $\{\log_2(K)\}$.

The redundancy version (RV) can be different for different PDSCH repetitions. This can occur when different versions of the same data are sent in different repetitions.

In some embodiments, RV information can be provided to the UE by dynamic signaling using DCI. FIG. to illustrates an example of a discrete set of RV indications in the DCI. A first indication of RV information in the DCI is RV1, a second indication of RV information in the DCI is RV2 and an Nth indication of RV information in the DCI is RVN. The value of N may be a pre-configured value that the UE is aware of or may be provided to the UE by higher layer signaling.

In some embodiments, RV information can be provided to the UE by a combination of semi-static signaling (RRC signaling or RRC signaling and MAC CE) and dynamic signaling such as using DCI. The UE can be notified that an RV field in the DCI should be interpreted as an RV configuration. UE behaviors can be defined for associating an RV pattern with PDSCH repetitions.

FIG. 11 shows an example of RV patterns. Each pattern is associated with a respective index value. Each row of the table in FIG. 11 includes an RV pattern and an associated RV configuration index. The RV values in the pattern are identified by particular identifiers, i.e. RV value #. A first row of the table includes an RV configuration index equal to "0" and an RV pattern including RV value1 and RV value2. A second row of the table includes an RV configuration index equal to "1" and an RV pattern including RV value2 and RV value3. A third row of the table includes an RV configuration index equal to "2" and an RV pattern including RV value1, RV value3 and RV value2. A fourth row of the table includes an RV configuration index equal to "3" and an RV pattern including RV value1, RV value1, RV value2 and RV value2.

It is to be understood that the example table shown in FIG. 11 is not intended to be any way limiting. The number of RV values in a pattern can vary from 1 to M, where M is a maximum number of RV values that are allotted for a pattern. Any combination, arrangement or repetition of RV values could be included in a respective RV pattern. Although the table in FIG. 11 has only 4 rows, it is to be understood that there could be more or fewer rows in the table.

In some embodiments, RV information can be provided to the UE in the form of a pre-configured RV pattern that is a fixed association. In some embodiments, RV information can be provided to the UE by RRC signaling without the DCI.

In DCI format 1_1, there are two RV fields that each correspond to a respective codeword (CW). However, for single-layer transmission, there is only one CW allowed, and therefore only one RV field is used. The UE interprets the contents of the RV field as an RV pattern configuration consisting of multiple RVs for different PDSCH repetitions. In some embodiments, new higher layer parameters can be included with an existing set of configuration parameters used for configuring the PDSCH to make a list of RV pattern configurations, by adding/modifying/releasing a RV pattern configurations. In some embodiments, a new higher layer parameter can be included with an existing set of configuration parameters used for configuring the PDSCH to notify UE on the existent of a list of RV pattern configurations.

Another transmission parameter that can vary for different transmission links and different repetitions is modulation order. Because transmission links that are associated with different TRPs via different TCI states can have different quality, modulation orders associated with links for different PDSCH repetitions can also be different. For a first repetition, the modulation and coding scheme (MCS), which includes information for both modulation order and code rate, is used to determine a transport block (TB) size for the repetition. For each subsequent repetition, because the TB does not change, it is not necessary to utilize the complete MCS information, only the modulation order. Hence for subsequent repetitions, only modulation order information in the MCS is used. In some embodiments, MCS indices can be used to select MCS information from a preconfigured MCS list or table. The entries in the table that are identified by the indices provide only modulation order information.

In some embodiments, modulation order information can be provided to the UE by dynamic signaling using DCI. FIG. 12 illustrates an example of a discrete set of indications in the DCI. A first indication of MCS information in the DCI is MCS1, a second indication of MCS information in the DCI is MCS2 and an Nth indication of MCS information in the DCI is MCSN. The value of N may be a pre-configured value that the UE is aware of or may be provided to the UE by higher layer signaling.

In some embodiments, modulation order information can be provided to the UE by a combination of semi-static signaling (RRC signaling or RRC signaling and MAC CE) and dynamic signaling such as using DCI. The UE can be notified that an MCS field in the DCI should be interpreted as an MCS pattern configuration. UE behaviors, which could be considered UE operating rules, can be defined for associating an MCS pattern with PDSCH repetitions.

FIG. 13 shows an example of MCS patterns. Each pattern is associated with a respective index value. Each row of the table in FIG. 13 includes an MCS pattern and an associated MCS configuration index. The MCS values in the pattern are identified by particular identifiers, i.e. MCS value #. A first row of the table includes an MCS configuration index equal to "0" and an MCS pattern including MCS value1 and MCS value2. A second row of the table includes an MCS configuration index equal to "1" and an MCS pattern including MCS value2 and MCS value3. A third row of the table includes an MCS configuration index equal to "2" and an MCS pattern including MCS value1, MCS value3 and MCS value2. A fourth row of the table includes an MCS configuration index equal to "3" and an MCS pattern including MCS value1, MCS value1, MCS value2 and MCS value2.

It is to be understood that the example table shown in FIG. 13 is not intended to be any way limiting. The number of MCS values in a pattern can vary from 1 to M, where M is a maximum number of MCS values that are allotted for a pattern. Any combination, arrangement or repetition of MCS values could be included in a respective MCS pattern. Although the table in FIG. 13 has only 4 rows, it is to be understood that there could be more or fewer rows in the table.

In some embodiments, modulation order information can be provided to the UE in the form of a pre-configured MCS pattern that is a fixed association. In some embodiments, modulation order information can be provided to the UE by RRC signaling without the DCI.

In DCI format 1_1, there are two MCS fields that each correspond to a respective CW. However, for single-layer transmission, there is only one CW allowed, and therefore only one MCS field is used. The UE interprets the contents of the MCS field as an MCS pattern configuration consisting of multiple MCSs for different PDSCH repetitions. In some embodiments, new higher layer parameters can be included with an existing set of configuration parameters used for configuring the PDSCH to make a list of MCS pattern configurations, by adding/modifying/releasing an MCS pattern configurations. In some embodiments, a new higher layer parameter can be included with an existing set of configuration parameters used for configuring the PDSCH to notify UE on the existent of a list of MCS pattern configurations.

The demodulation reference signal (DMRS) sequence initialization can be different for different PDSCH repetitions. This can occur when different versions of the same data are sent in different repetitions.

In some embodiments, DMRS sequence initialization information can be provided to the UE by dynamic signaling using DCI. FIG. 14 illustrates an example of a discrete set of DMRS sequence initialization indications in the DCI. A first indication of DMRS sequence initialization information in the DCI is DMRS1, a second indication of DMRS sequence initialization information in the DCI is DMRS2 and an Nth indication of DMRS sequence initialization information in the DCI is DMRSN. The value of N may be a pre-configured value that the UE is aware of or may be provided to the UE by higher layer signaling.

In some embodiments, DMRS sequence initialization information can be provided to the UE by a combination of semi-static signaling (RRC signaling or RRC signaling and MAC CE) and dynamic signaling such as using DCI. The UE can be notified that a DMRS sequence initialization field in the DCI should be interpreted as a DMRS sequence initialization configuration. UE behaviors can be defined for associating a DMRS sequence initialization pattern with PDSCH repetitions.

FIG. 15 shows an example of DMRS sequence initialization patterns for which each pattern is associated with a respective index value. Each row of the table in FIG. 15 includes a DMRS pattern and an associated DMRS configuration index. The DMRS values in the pattern are identified by particular identifiers, i.e. DMRS value #. A first row of the table includes a DMRS configuration index equal to "0" and a DMRS pattern including DMRS value1 and DMRS value2. A second row of the table includes a DMRS configuration index equal to "1" and a DMRS pattern including DMRS value2 and DMRS value3. A third row of the table includes a DMRS configuration index equal to "2" and a DMRS pattern including DMRS value1, DMRS value3 and DMRS value2. A fourth row of the table includes a DMRS configuration index equal to "3" and a DMRS pattern including DMRS value1, DMRS value1, DMRS value2 and DMRS value2.

It is to be understood that the example table shown in FIG. 15 is not intended to be any way limiting. The number of DMRS values in a pattern can vary from 1 to M, where M is a maximum number of DMRS values that are allotted for a pattern. Any combination, arrangement or repetition of MCS values could be included in a respective DMRS pattern. Although the table in FIG. 15 has only 4 rows, it is to be understood that there could be more are less rows in the table.

In some embodiments, DMRS sequence initialization information can be provided to the UE in the form of a pre-configured DMRS sequence initialization pattern that is a fixed association. In some embodiments, DMRS sequence initialization information can be provided to the UE by RRC signaling without the DCI.

Solutions that are described above for use in facilitating PDSCH repetitions from multiple TRPs or beams with the intent of improving reliability of the PDSCH with regard to the particular described examples of associating QCL information with TCI states or AP values may also apply to other parameter indications provided in to the UE in the DCI. Examples of other parameters indications include, but are not limited to carrier indicator, bandwidth part indicator, frequency domain resource assignment, time domain resource assignment, virtual resource block to physical resource block (VRB-to-PRB) mapping, rate matching indicator, information related to transport block1/transport block2 (TB1/TB2), HARQ process number, downlink assignment index, transmit power control (TPC) command for scheduled physical uplink control channel (PUCCH), PUCCH resource indicator, sounding reference signal (SRS) request, PDSCH-to-HARQ_feedback timing indicator, code block group (CBG) transmission information and CBG flushing out information.

According to another aspect of the present application, there is provided another manner of indicating multiple parameters for different PDSCH repetitions, where the repetitions are from more than one TRP or beam. The parameters include, but are not limited to QCLs, APs, and MCSs. In some embodiments, this may involve using multiple DCIs, each DCI indicating a different TCI state for a different PDSCH repetition.

In some embodiments, the multiple DCIs are transmitted at the same time. In some embodiments, the multiple DCIs are transmitted with small time differences between the DCIs. In some embodiments, the multiple DCIs are transmitted at different times. When there is a small or large time difference between the DCIs, the time difference can be either pre-defined or configurable.

In some embodiments, the PDSCH repetitions associated with the DCIs are transmitted at the same time. In some embodiments, the PDSCH repetitions associated with the DCIs are transmitted with small time differences between the DCIs. In some embodiments, the PDSCH repetitions associated with the DCIs at transmitted at different times.

The DCIs and PDSCHs for the set of repetitions can be transmitted from one TRP or more than one TRP.

When the PDSCH repetitions include the same HARQ process number, with the same time, or the same MCS, or the same Resource allocation (RA) then Chase combining can be used to combine the PDSCH repetitions. When the PDSCH repetitions include the same HARQ process number, but different RVs, different MCS and different RA, then incremental redundancy (IR) combining can be used to combine the PDSCH repetitions.

For a self-contained PDCCH, transmission block (TB) size information based on, for example, MCS information, not only modulation order, is given in every redundancy version (RV), not only in the first RV (RV0), in case the PDCCH with RV0 is missed.

When the PDSCH repetitions include the same HARQ process number, the UE can send separate ACK/NACK for each PDSCH repetition or a combined ACK/NACK.

When the PDSCH repetitions include different HARQ process numbers, data repetition is done in the higher layer, and there is no HARQ combining in the physical (PHY) layer. However, there is diversity gain. When the UE correctly receives at least one copy of the PDSCH repetition, it can stop receiving or processing additional repetitions.

When the PDSCH repetitions include different HARQ process numbers, the UE can send separate ACK/NACK for each PDSCH repetition Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for a user equipment (UE) comprising:
    receiving a first transmission configuration indication (TCI) and a second TCI, the first TCI associated with a first Physical Downlink Shared Channel (PDSCH) repetition to be received and the second TCI associated with a second PDSCH repetition to be received, each TCI identifying a TCI state that indicates a Quasi-Co-Location (QCL) information for the respective PDSCH repetition; and
    receiving the first PDSCH repetition and the second PDSCH repetition.

2. The method of claim 1, wherein receiving the first TCI and the second TCI comprises receiving the first and second TCIs by one of:
    dynamic signaling using downlink control information (DCI);
    a combination of semi-static signaling using higher layer signaling and dynamic signaling;
    a combination of using a predefined set of configurations and dynamic signaling to select a particular configuration of the predefined set of configurations; and
    a predefined set of indications either known to the UE or signaled using higher layer signaling.

3. The method of claim 2, wherein receiving the first and second TCIs by dynamic signaling using DCI comprises:
    receiving a plurality of TCIs including the first TCI and the second TCI, each TCI identifying a TCI state that indicates the QCL information for a respective PDSCH repetition.

4. The method of claim 3, wherein a number of the plurality of TCIs is equal to a total number of a plurality of PDSCH repetitions including the first PDSCH repetition and the second PDSCH repetition, and each TCI is associated with a respective PDSCH repetition.

5. The method of claim 3, wherein a number of the plurality of TCIs is less than a total number of a plurality of PDSCH repetitions including the first PDSCH repetition and the second PDSCH repetition, and a pattern of TCIs associated with the plurality of PDSCH repetitions is repeated partially, or more than once, to correspond to the total number of the plurality of PDSCH repetitions.

6. The method of claim 3, wherein a number of the plurality of TCIs is greater than a total number of a plurality of PDSCH repetitions including the first PDSCH repetition and the second PDSCH repetition, and the plurality of TCIs are used in an order received for each PDSCH repetition until all of the plurality of PDSCH repetitions are received.

7. The method of claim 2, wherein receiving the first and second TCIs by dynamic signaling using DCI comprises:
receiving a plurality of antenna port (AP) or AP group configuration indications, each AP or AP group configuration indication being associated with a TCI state that indicates a QCL information for a respective PDSCH repetition.

8. The method of claim 7, wherein a number of the plurality of AP or AP group configuration indications is equal to a number of TCI states, and each AP or AP group configuration indication being associated with a respective TCI.

9. The method of claim 7, wherein a number of the plurality of AP or AP group configuration indications is less than a number of TCI states;
if there is only one AP or AP group configuration indication, the same AP or AP group configuration indication is used for each TCI state; and
if there is more than one AP or AP group configuration indication, an association between the more than one AP or AP group configuration indication and the TCI states is received.

10. The method of claim 7, wherein a number of the plurality of AP or AP group configuration indications is greater than a total number of a plurality of PDSCH repetitions including the first PDSCH repetition and the second PDSCH repetition, and the TCI states are configured in an order received for each respective PDSCH repetition until all of the plurality of PDSCH repetitions are received.

11. The method of claim 1, wherein receiving the first TCI and the second TCI comprises receiving the first and second TCIs in a DCI; wherein the DCI has one of the following formats:
format (1_0);
format (1_1); and
format (1_2).

12. The method of claim 11, wherein the format (1_2) has a payload smaller than that of the format (1_1).

13. The method of claim 1, wherein receiving the first TCI and the second TCI comprises:
receiving a plurality of TCI state pattern configurations, a plurality of AP or AP group pattern configurations, or a plurality of combinations of TCI state pattern configurations and AP or AP group pattern configurations by higher layer signaling.

14. The method of claim 13 further comprising:
receiving a media access control (MAC) control element (CE) to activate at least one TCI state pattern configuration, at least one AP or AP group pattern configuration, or at least one combination of a TCI state pattern configuration and an AP or AP group pattern configuration.

15. The method of claim 13, further comprising:
receiving an indication that a TCI state is included in a DCI to be received by the UE; and
receiving in the DCI at least one of:
at least one indication of a TCI state for a respective PDSCH repetition; and
at least one indication of a TCI state pattern that indicates a particular TCI pattern configuration, an AP or AP group pattern that indicates a particular AP or AP group pattern configuration, or at least one combination of a TCI state pattern configuration and an AP or AP group pattern configuration that indicates a particular combination of TCI pattern configuration and AP or AP group pattern configuration.

16. The method of claim 15, wherein the at least one indication is an index of a table or list, and the index is associated with the particular TCI pattern configuration, the particular AP or AP group pattern configuration, or the particular combination of TCI pattern configuration and AP or AP group pattern configuration.

17. The method of claim 1, wherein receiving the first TCI and the second TCI comprises:
receiving an identification of a TCI state pattern for identifying a particular TCI state pattern from a plurality of predefined TCI state patterns on the UE, each TCI state pattern identifying a set of TCI states, each TCI state corresponding to a QCL information for one of the PDSCH repetitions.

18. The method of claim 1, wherein receiving each of the first TCI and the second TCI comprises:
receiving an antenna port (AP) pattern indication identifying a particular AP or AP group pattern from a plurality of predefined AP or AP group patterns, each AP or AP group pattern associated with a TCI state pattern for the PDSCH repetitions.

19. The method of claim 1, wherein multiple reference signal (RS) ports associated with a TCI state are associated with at least one DMRS port or DMRS port group.

20. The method of claim 19, wherein the RS ports are at least one of:
phase tracking reference signal (PT-RS) ports;
channel state information reference signal (CSI-RS) ports; and
synchronization signal block (SSB) ports.

21. The method of claim 1 further comprising:
receiving an indication of a first instance of a transmission parameter and a second instance of a transmission parameter, the first and second instances of the transmission parameter associated with a respective PDSCH repetition.

22. The method of claim 21, wherein the transmission parameter is at least one of:
redundancy version (RV);
modulation order; and
DMRS sequence initialization.

23. The method of claim 1 further comprising:
for a second signal transmitted at a transmitter end of the UE on a second transmission layer, receiving an indication for each of two or more QCL information, each QCL information associated with at least one PDSCH repetition of the second signal; and receiving the at least one PDSCH repetition of the second signal based at least in part on the QCL information associated with the at least one PDSCH repetition of the second signal.

24. The method of claim 1, wherein the first PDSCH repetition and the second PDSCH repetition are within the same slot.

25. The method of claim 1, wherein the first PDSCH repetition and the second PDSCH repetition occupy the same symbol allocation across different slots.

26. A user equipment (UE) comprising:
at least one antenna;
a processor; and
a processor readable medium having stored thereon processor executable instructions that when executed cause the processor to:
receive a first transmission configuration indication (TCI) and a second TCI, the first TCI associated with a first Physical Downlink Shared Channel (PDSCH) repetition to be received and the second TCI associated with a second PDSCH repetition to be received, each TCI identifying a TCI state that indicates a Quasi-Co-Location (QCL) information for the respective PDSCH repetition; and
receive the first PDSCH repetition and the second PDSCH repetition.

\* \* \* \* \*